(12) United States Patent
Kremers

(10) Patent No.: US 7,748,837 B2
(45) Date of Patent: Jul. 6, 2010

(54) METHOD AND PRINTER FOR INK JET PRINTING

(75) Inventor: Martinus A. Kremers, Ottersum (NL)

(73) Assignee: OCÉ-Technologies B.V., Venlo (NL)

( * ) Notice: Subject to any disclaimer, the term of this patent is extended or adjusted under 35 U.S.C. 154(b) by 610 days.

(21) Appl. No.: 11/588,322

(22) Filed: Oct. 27, 2006

(65) Prior Publication Data

US 2007/0097197 A1    May 3, 2007

(30) Foreign Application Priority Data

Oct. 27, 2005    (EP)    .................. 05110073

(51) Int. Cl.
B41J 2/21    (2006.01)
B41J 2/14    (2006.01)
B41J 2/01    (2006.01)

(52) U.S. Cl. ............................ 347/102; 347/43; 347/51

(58) Field of Classification Search .................. 347/100, 347/102

See application file for complete search history.

(56) References Cited

U.S. PATENT DOCUMENTS

| 2002/0149660 | A1* | 10/2002 | Cleary et al. ................. 347/102 |
| 2002/0191063 | A1* | 12/2002 | Gelbart et al. ............... 347/101 |
| 2003/0035030 | A1* | 2/2003 | Hamamoto et al. ........... 347/57 |
| 2003/0184633 | A1 | 10/2003 | Vanhooydonck |
| 2004/0189772 | A1 | 9/2004 | Arai |
| 2006/0033794 | A1* | 2/2006 | Yamanobe .................. 347/102 |

* cited by examiner

Primary Examiner—Matthew Luu
Assistant Examiner—Kendrick X Liu
(74) Attorney, Agent, or Firm—Birch, Stewart, Kolasch & Birch LLP

(57) ABSTRACT

A method for ink jet printing with light-curing ink, which includes the steps of printing a first ink dot of a color, irradiating the first ink dot with light, printing a second ink dot with the same color and which at least partially overlaps with the first ink dot, and irradiating the second ink dot with light.

14 Claims, 2 Drawing Sheets

METHOD AND PRINTER FOR INK JET PRINTING

This application claims priority under 35 U.S.C. §119(a) on Patent Application No. 05110073.3 filed in Europe on Oct. 27, 2005, the entire contents of which is hereby incorporated by reference.

BACKGROUND OF THE INVENTION

The present invention relates to a method for providing ink jet printing with light-curing ink and a printer for carrying out this method.

An ink jet printer typically comprises a carriage that is movable in reciprocation in a main scanning direction across a recording medium, e.g., a sheet of paper. The carriage has mounted thereon a number of printheads, at least one for each color, so that dots of liquid ink may be expelled onto the surface of the paper, and a stripe or swath of the image is printed during each pass of the carriage. Then, the paper is advanced in a sub-scanning direction, so that the next swath may be printed.

The ink that has been deposited on the paper should be cured, i.e., caused to solidify, relatively quickly, so that the image will not be damaged in subsequent handling or processing steps. Solvent-based inks may be cured by letting the solvent evaporate from the ink. A hot melt ink jet printer uses ink that is solid at room temperature and is melted in the printhead, and curing is achieved by allowing the ink to cool down. In a print process using light-curing ink, the solidification of the ink is induced by irradiating the printed ink dots with light, preferably UV light. This has the advantage that the curing process can be accelerated and the curing time can be finely controlled, thereby controlling the amount in which the printed ink dots flow out on the paper.

However, the light rays used for irradiating the ink dots must be strong enough to penetrate into the volume of the ink. This requirement is particularly challenging when taking into account that the colorants, i.e., the dyes and/or pigment, of some ink may have a low transparency for light rays. Examples of ink with low transparency colorants are black ink, as the black colorant may be highly absorptive for the light rays, and white ink, as the white colorant may be highly reflective for the light rays. Even when the irradiation with light is used only for "pinning" the ink dots, i.e., for solidifying only a certain ink layer at the surface and at the rim of the dot, the light has to penetrate into the ink to some extent. Thus, the power of UV lamps used for curing the ink increases with increasing printing speed and also with decreasing transparency of the ink. As a result, especially the low transparency of black ink and white ink necessitates the use of relatively strong and expensive UV lamps.

SUMMARY OF THE INVENTION

It is an object of the present invention to reduce the power required for the lamps that are used for curing the ink in an ink jet print process with light-curable ink.

According to the present invention, this object is achieved by a method comprising the following sequence of steps for printing an individual pixel: printing a first ink dot of color, irradiating the first ink dot with light, printing a second ink dot of the same color at least partially overlapping with the first ink dot and irradiating the second ink dot with light. The present method has the advantage that each pixel is composed of a plurality of ink layers which have a reduced thickness, so that light rays with relatively low intensity are sufficient for penetrating through this ink layer and curing or pinning the same, before the next layer of the same color is deposited. Thus, it is possible to use inexpensive irradiating lamps which have only a relatively small amount of power.

In a conventional ink jet printer configured for bidirectional printing with light-curing ink, the carriage may carry two UV lamps that are arranged at both ends of the row of printheads, and the lamps are activated alternatingly in the forward and return passes of the carriage, so that the ink dots will always be cured immediately after they have been printed. Alternatively, both lamps are activated both in the forward and return passes of the carriage. In a preferred embodiment of the invention, the carriage has at least two printheads for the low transparency ink, and a third irradiation lamp is disposed between these two printheads. Thus, regardless of the direction of travel of the printhead, the first dot of a low transparency ink that has been printed with one of the printheads will be cured with the intervening lamp, and the second dot of the same low transparency ink that has been printed on top of the first one will be cured with one of the two outer lamps. The fact that, in this case, three lamps are needed instead of only two is over-compensated by the cost savings that is achieved by reducing the power of the lamps.

It will be understood that the concept described above may also be used for ink colors other than the low transparency ink colors such as black and white, if desirable. Likewise, the duplicate sequence of printing and curing may also be used in applications where dots of different colors are printed one on top of the other.

When the printer is operated in a multi-pass mode, the first dot may be printed in a first pass, and the second dot on top of the first one may be printed in a later pass of the carriage. Then, it is sufficient to use only one printhead per color, and two lamps are sufficient for bidirectional printing.

In another embodiment, two printheads for the same color are used for printing the first and second dots, but these printheads are offset relative to one another in the sub-scanning direction, and two irradiating lamps are arranged to extend over both of the two printheads, so that the method according to the present invention can be performed in a high-speed two-pass print mode.

BRIEF DESCRIPTION OF THE DRAWINGS

Preferred embodiments of the present invention will now be described in conjunction with the drawings, wherein.

DETAILED DESCRIPTION OF THE INVENTION

Figure 1:
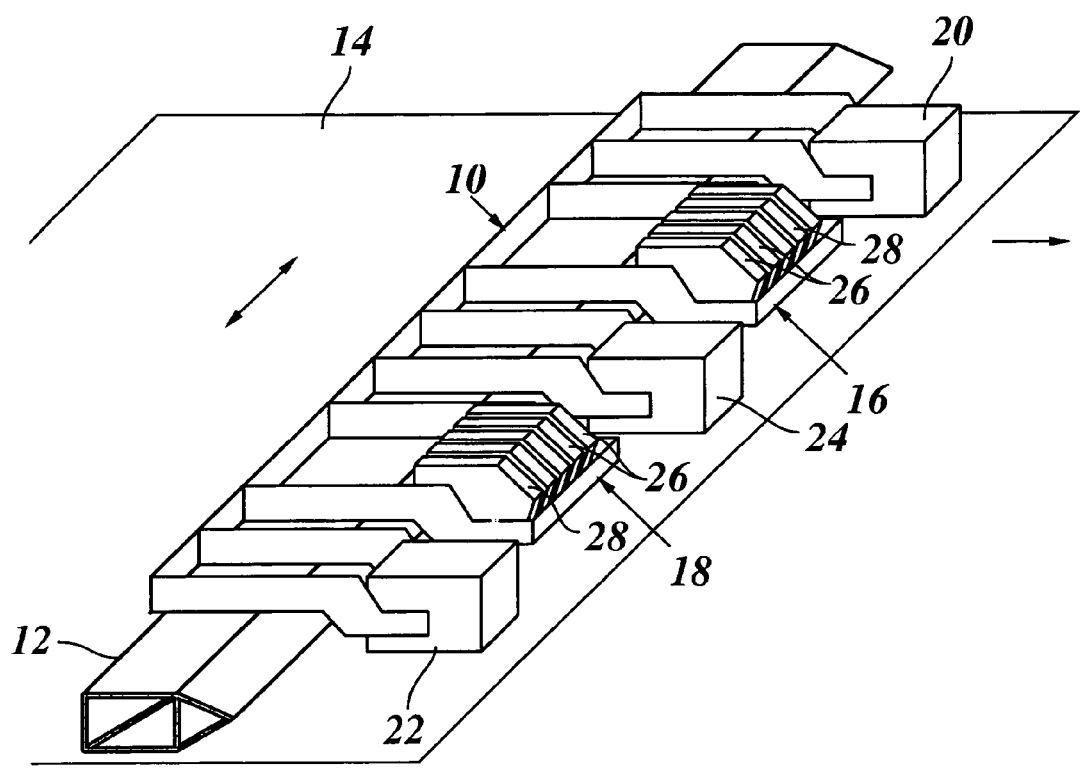
FIG. 1 is a schematic perspective view of the essential elements of an ink jet printer.

As is shown in FIG. 1, an ink jet printer comprises a carriage 10 that is movable back and forth along a guide rail 12 in a main scanning direction X across a recording medium 14 that is advanced step-wise in a sub-scanning direction Y. The recording medium may be a sheet or a web. The carriage 10 comprises two sets of printheads, 16, 18, two outer irradiating lamps 20, 22 embracing the two sets of printheads, and a third central irradiating lamp 24 disposed between the two sets of printheads 16, 18. Each set of printheads comprises two printheads 26 for black ink and three further printheads 28 for the colors cyan, magenta and yellow. The printheads 26 for black ink are arranged adjacent to the central irradiating lamp 24.

A reason for providing two printheads 26 for black ink in each set of printheads is to be able to accommodate a larger amount of black ink in the printheads, since the user frequently wants to print only black and white images, which consumes the black ink more rapidly than colored inks. Another advantage is that the two printheads 26 of each set of printheads may be staggered such that the black images can be printed with a higher resolution. However, the printheads 26 are always arranged such that one printhead 26 of the set 16 is capable of printing an ink dot right on top of a dot that has been printed with one of the printheads 26 of the other set 18, and vice versa. Likewise, the printheads 28 of both sets of printheads are arranged to print ink dots on identical pixel positions, and the sequence of colours in the two sets 16 and 18 is mirror-symmetric.

As is known in the art, each printhead 26, 28 comprises an array of nozzles that are facing the recording medium 14, so that a plurality of pixel lines can be printed in one pass of the carriage 10. The irradiating lamps 20, 22 and 24 are arranged to face the recording medium 14 so as to irradiate the ink dots that have just been printed with ultraviolet light in order to cure or pin the ink. Ink dots that have been printed with one of the printheads of the set 16 will be cured either with the lamp 20 or with the lamp 24, depending on the direction of travel of the carriage 10. Similarly, ink dots that have been printed with one of the printheads of the set 18 will be cured either with the lamp 22 or with the lamp 24.

The operation of the printer illustrated in FIG. 1 will be explained in greater detail in conjunction with FIGS. 2 and 3 which show a simplified embodiment in which each of the two sets 16, 18 has only a single printhead 26 for black ink (K). The colors assigned to the printheads 28 are designated as Y, M and C.

Figure 2:
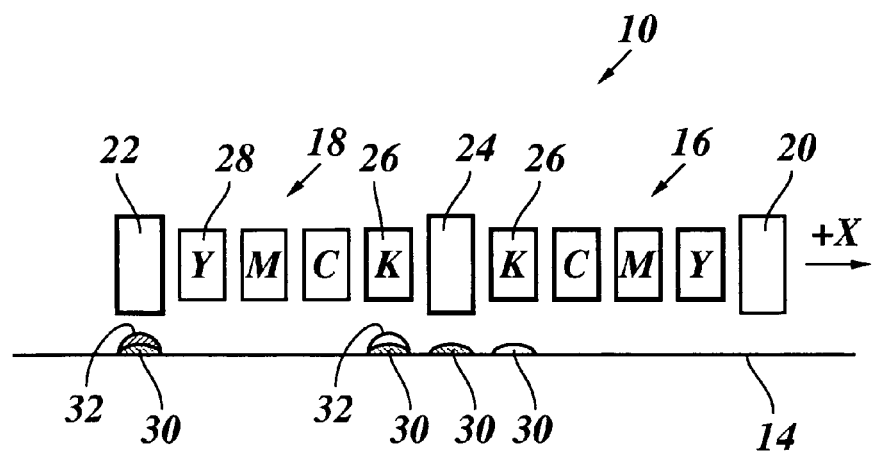
FIGS. 2 and 3 are diagrams illustrating a print process according to the present invention.

In FIG. 2, the carriage 10 moves in a positive X-direction, i.e., to the right the drawing. The printheads and lamps that are active in this state have been highlighted by bold lines. These are the four printheads of the set 16, the black printhead 26 of the set 18 and the lamps 22 and 24. During the travel of the carriage, the printhead 26 of the set 16 prints first dots 30 in subsequent pixel positions. One of the dots 30 is just being printed, another one is being cured under the lamp 24 (symbolized by hatching), and a third one has already been cured and is now in a position underneath the printhead 26 of the second set 18, and this printhead is used for printing a second black dot 32 on top of the first one. The second dot 32 is cured by means of the lamp 22, as is symbolized by another pair of dots 30, 32. Thus, a black pixel is composed of two dots which have only a comparatively small thickness and are cured in subsequent curing steps. As a result, for a given printing speed, the power of the lamps 22, 24 that is required for sufficiently curing the ink can be reduced significantly.

Figure 3:
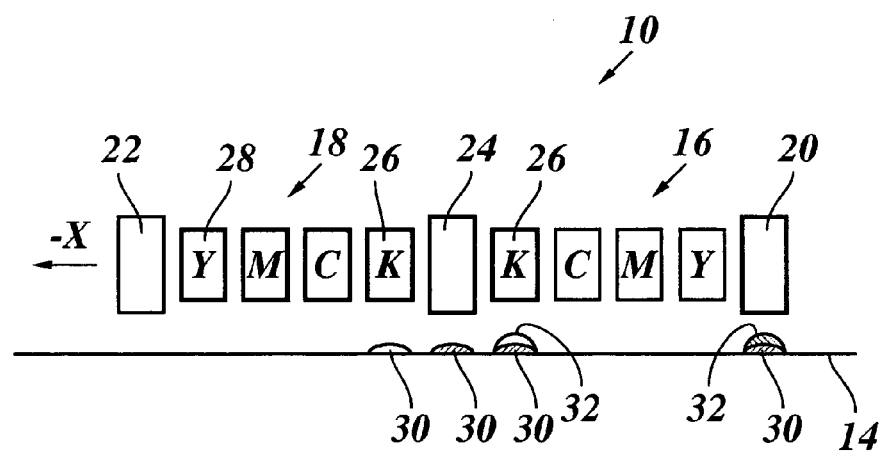

FIG. 3 illustrates a state in which the carriage 10 moves in a negative X-direction. Here, the first dots 30 are printed with the printhead 26 of the second set 18, and the second dots are printed with the printhead 26 of the set 16, and the lamps 24 and 20 are used for curing.

The lamps 20, 22 and 24 may be Hg-lamps, Xe-flash lamps, and even blue or UV LEDs may be considered in view of the relatively low power.

The printing method that has been shown for black ink in FIGS. 2 and 3 may equivalently be applied to inks in the other colors or even to combinations of inks in different colors, if desired.

Figure 4:
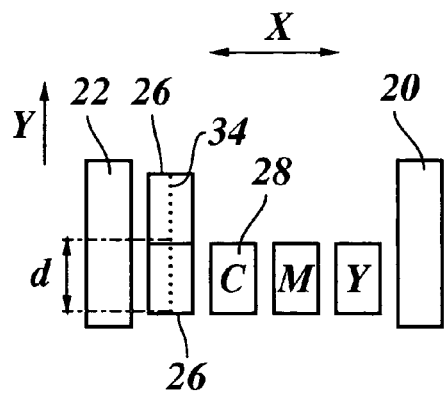
FIGS. 4 and 5 are diagrams illustrating arrangements of printheads and irradiating lamps according to other embodiments of the present invention.

FIG. 4 illustrates a modified arrangement of printheads 26, 28 and lamps 20, 22 on the carriage 10. Here, only the printheads 26 for black ink have been provided in duplicate, so that the method according to the present invention can be applied only for black ink. The printheads 28 for colored ink are configured to expel droplets that have twice the volume of the droplets of black ink expelled from the nozzles 34 of the printheads 26.

The printheads 26 are offset relative to one another in the sub-scanning direction Y. The first dot 30 of black ink is printed with the printhead 26 that is aligned with the printheads 28 and is cured either with the lamp 20 or the lamp 22. Then, the recording medium 14 is advanced by an amount "d", so that the second dots 32 are printed on top of the first dots by means of the other printhead 26. The second dots 32 are cured either with the lamp 20 or the lamp 22, the length of which is so large that they extend over both printheads 26.

Instead of providing two printheads 26, it is also possible to provide a single printhead having twice the length of the printheads 28.

In the embodiment shown in FIG. 4, the first and second dots are printed in two subsequent passes of the carriage 10. As an alternative, the second black printhead 26 may be spaced apart from the first printhead by an integral multiple of "d", so that the second dots are printed in a later pass of the carriage. Then, it will be preferable to provide separate lamps for curing the second dots 32.

Figure 5:
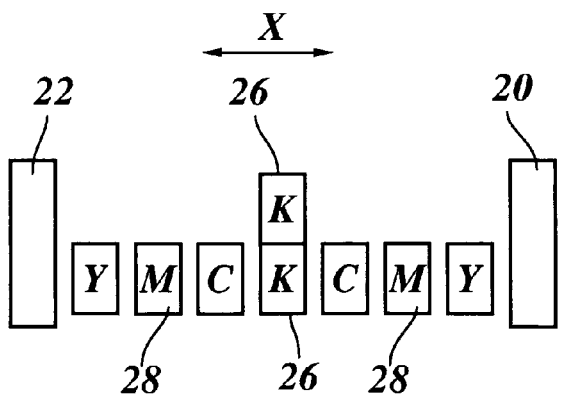

In the arrangement shown in FIG. 4, two lamps 20 and 22 are sufficient. The same holds true for the embodiment shown in FIG. 5, where, similarly as in FIGS. 2 and 3, two printheads 28 per color are provided in a mirror-symmetric arrangement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for ink jet printing with light-curing ink, which comprises the steps of:
    printing a first ink dot of a color,
    irradiating the first ink dot with light,
    printing a second ink dot of the same color, in the same pixel position as the first ink dot, and
    irradiating the second ink dot with light, wherein the pixel position is defined as a single dot position.

2. The method of claim 1, wherein said color is black or white.

3. The method of claim 1, wherein the first and second ink dots are printed with at least two separate printheads.

4. The method of claim 1, wherein at least two printheads and at least two irradiating lamps are mounted on a carriage, and the carriage is moved back and forth in a main scanning direction (X) relative to a recording medium.

5. The method of claim 4, wherein the first and second ink dots are printed in one and the same pass of the carriage.

6. The method of claim 4, wherein said first and second ink dots are printed in different passes of the carriage.

7. A printer for carrying out the method of claim 1, which comprises a carriage configured to move back and forth relative to a recording medium and carrying at least two printheads for the same color, said printheads being arranged between two irradiating lamps, wherein a third irradiating lamp is arranged between said two printheads.

8. A printer for carrying out the method of claim 1 which comprises a carriage configured to move back and forth relative to a recording medium in a main scanning direction (X) and carrying at least two print nozzles for the same color, said nozzles being offset relative to one another in a sub-scanning direction (Y) normal to said main scanning direction (X), and each of said nozzles being arranged between two irradiating lamps, wherein said at least two nozzles are arranged to print ink dots on identical pixel positions in subsequent passes of the carriage.

9. The printer according to claim 7, which comprises at least one additional printhead for a different color, and wherein at least two printheads for the same color are configured to print dots, the ink volume of which is smaller than the ink volume of dots printed with the additional printhead.

10. The printer according to claim 8, which comprises at least one additional printhead for a different color, and wherein at least two printheads for the same color are configured to print dots, the ink volume of which is smaller than the ink volume of dots printed with the additional printhead.

11. The printer according to claim 7, which comprises at least two additional printheads for at least one additional color, and wherein the printheads for the various colors are arranged mirror-symmetrically on the printhead.

12. The printer according to claim 8, which comprises at least two additional printheads for at least one additional color, and wherein the printheads for the various colors are arranged mirror-symmetrically on the printhead.

13. The method of claim 1, wherein each pixel is composed of a plurality of ink drop layers which have a reduced thickness whereby the first ink dot is completely cured before a second ink drop of a next layer of reduced thickness and of the same color is deposited in the same pixel position and cured.

14. The printer of claim 8, wherein the irradiating lamps are disposed such that a first ink dot of said print ink dots is completely cured before a second ink drop of the same color is deposited in the same pixel position and cured.

* * * * *